(12) United States Patent
Johnson (10) Patent No.: US 8,398,315 B2
(45) Date of Patent: Mar. 19, 2013

(54) QUICK-RELEASE APPARATUS

(76) Inventor: Joseph M. Johnson, San Luis Obispo, CA (US)

( * ) Notice: Subject to any disclaimer, the term of this patent is extended or adjusted under 35 U.S.C. 154(b) by 0 days.

(21) Appl. No.: 13/213,726

(22) Filed: Aug. 19, 2011

(65) Prior Publication Data

US 2012/0106946 A1    May 3, 2012

Related U.S. Application Data

(60) Provisional application No. 61/409,873, filed on Nov. 3, 2010.

(51) Int. Cl.
*G03B 17/00* (2006.01)
*G03B 11/00* (2006.01)

(52) U.S. Cl. .................................. 396/422; 396/544
(58) Field of Classification Search .................. 396/419, 396/422, 544; 248/187.1
See application file for complete search history.

(56) References Cited

U.S. PATENT DOCUMENTS

| | | | | |
|---|---|---|---|---|
| 2,614,471 A * | 10/1952 | Markowitz | .................... | 396/422 |
| 4,291,967 A * | 9/1981 | Jackson, Jr. | .................... | 396/422 |
| 4,525,052 A * | 6/1985 | Kosugi et al. | ................. | 396/419 |
| 4,591,250 A * | 5/1986 | Woodruff | ........................ | 396/50 |
| 4,866,465 A * | 9/1989 | Gallegos | ........................ | 396/189 |
| 4,926,262 A * | 5/1990 | Rowens, Sr. | .................. | 348/375 |
| 5,332,183 A * | 7/1994 | Kagayama | ................. | 248/187.1 |
| 6,827,319 B2 * | 12/2004 | Mayr | ........................ | 248/187.1 |
| 7,645,046 B1 * | 1/2010 | Kuntz | ........................ | 396/544 |
| 7,694,923 B2 * | 4/2010 | Joy et al. | .................... | 248/187.1 |
| 7,828,256 B2 * | 11/2010 | Speggiorin | ................. | 248/187.1 |
| 7,864,244 B2 * | 1/2011 | Desorbo | ....................... | 348/373 |
| 2002/0179787 A1 * | 12/2002 | Nakatani | .................... | 248/187.1 |
| 2003/0218108 A1 * | 11/2003 | Werner | ....................... | 248/187.1 |
| 2009/0039215 A1 * | 2/2009 | Hilderman et al. | ........ | 248/187.1 |
| 2011/0129210 A1 * | 6/2011 | McGucken | .................... | 396/422 |

\* cited by examiner

*Primary Examiner* — Christopher Mahoney
(74) *Attorney, Agent, or Firm* — Chernoff Vilhauer McClung & Stenzel, LLP

(57) ABSTRACT

An assembly for selectively lockable attachment between photographic accessories.

16 Claims, 6 Drawing Sheets

QUICK-RELEASE APPARATUS

CROSS-REFERENCE TO RELATED APPLICATIONS

This application claims the benefit of U.S. Provisional App. No. 61/409,873, filed Nov. 3, 2010.

BACKGROUND OF THE INVENTION

The present invention generally relates to an apparatus for allowing rapid assembly and disassembly of photographic equipment.

Figure 1:
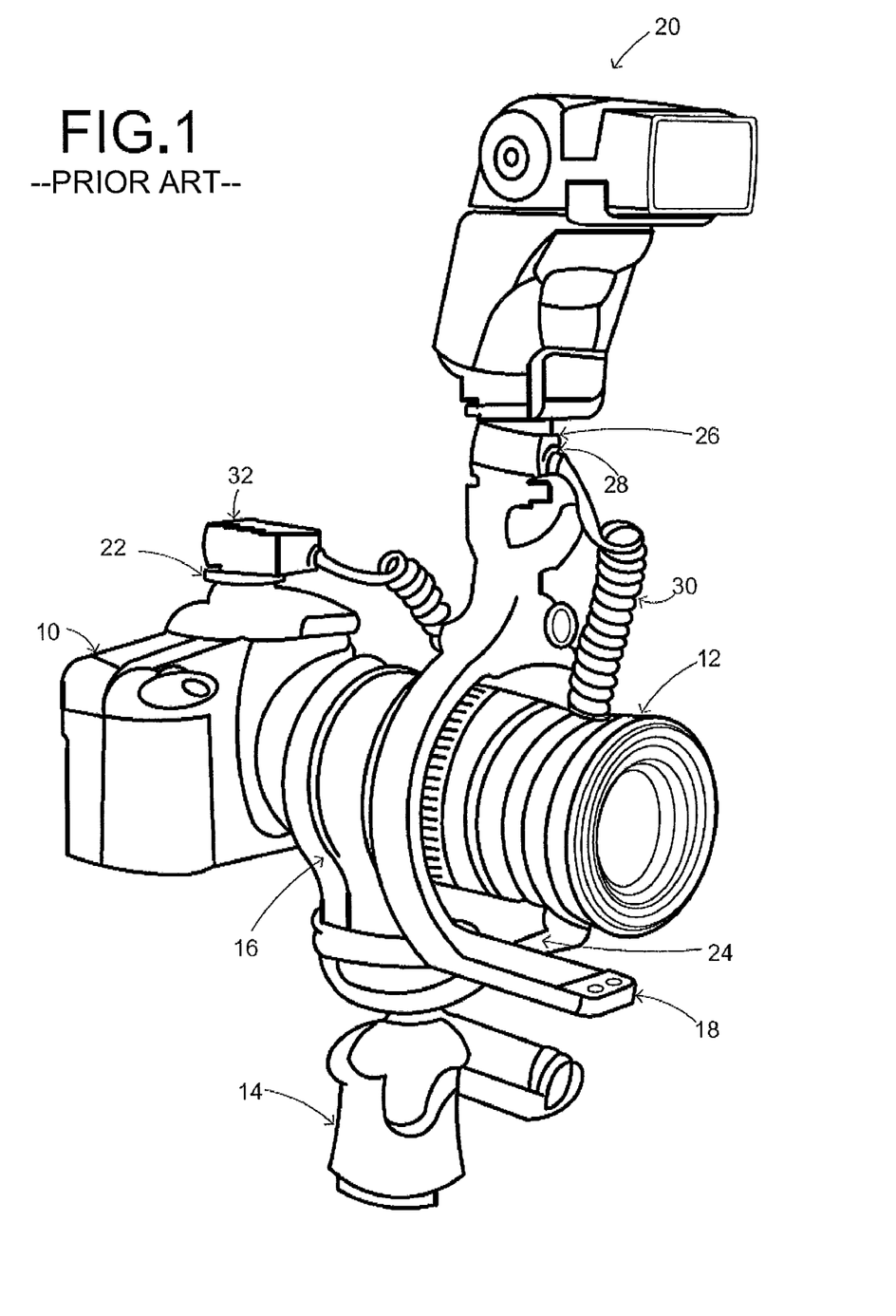
FIG. 1 shows an exemplary prior art photographic assembly.

Photographic assemblies may range from a camera mounted on a monopod to highly complex assemblies. FIG. 1, for example, illustrates a photographic assembly of a type often used in macro photography. A camera 10 includes a telephoto lens 12 that is mounted to a tripod head 14 using a lens collar 16. This arrangement is commonly used when telephoto lens 12 that is sufficiently heavy that the camera 10 to which it is attached would not balance properly on a tripod were the camera 10 attached directly to the tripod head 14.

It is often desired to use a flash 20 aligned vertically above the telephoto lens 12, rather than being mounted atop the shoe 22 of the camera 10. This configuration may be desirable for several reasons. First, if the camera 10 is taking a macro image of an object very close to the telephoto lens 12, the telephoto lens 12 may interfere with the illumination of a flash 20 mounted to the shoe 22 of the camera 10. Second, some lens collars 16 allow for rotation of the camera 10 between a landscape and portrait orientation, and it may be undesirable to rotate the flash 20 with the camera 10. In this regard, the lens collar 16 may be mounted on an elongate rail 18 along with a flash bracket 24 that supports an off-camera shoe adapter 26, to which the flash 20 is detachably mounted. The off-camera shoe adapter 26 includes a socket 28 that receives a cord 30 from a remote unit 32 mounted to the shoe 22 of the camera 10. This arrangement permits the camera 10 and telephoto lens 12 to be rotated within the collar 16 without any corresponding rotation of the flash 20.

Other photographic assemblies exist that are at least as complex as the exemplary assembly shown in FIG. 1. For example, when taking a series of images to be later stitched together in a multi-layer panoramic, a camera is preferably mounted to a tripod by a series of rails and rotating clamps such that the nodal point of the lens may be aligned directly above a vertical axis of rotation centered on the tripod head, while the nodal point can also be rotated about a horizontal axis so that the lens can both pan in an up-down direction and rotate parallel to the ground. This arrangement reduces parallax between successive images which assists in seamless stitching of the captured images.

Constructing these assemblies can consume quite a bit of time, which in some instances is scarce due to transient lighting conditions or fleeting subject matter such as wildlife. Therefore, it is beneficial to reduce the time it takes to assemble multiple pieces of photographic equipment to each other when used to capture a particular image.

Many quick-release clamps exist by which, for example, a camera may be mounted to a tripod. Typically a quick-release clamp requires that the camera or other piece of photographic equipment have an attached dovetail mount that may be inserted into a channel of the quick release clamp. The channel may selectively, alternately, clamp and release an inserted dovetail mount by turning a knob, moving a lever, etc. Unfortunately, there are often circumstances where assembly between two pieces of photographic equipment using these quick-release clamps is too slow, particularly when multiple pieces of photographic equipment need to be connected in an intricate assembly.

What is desired, therefore, is a system for alternately searching and releasing one piece of photographic equipment to and from another, respectively, in an efficient manner.

DETAILED DESCRIPTION OF PREFERRED EMBODIMENT

Figure 2:
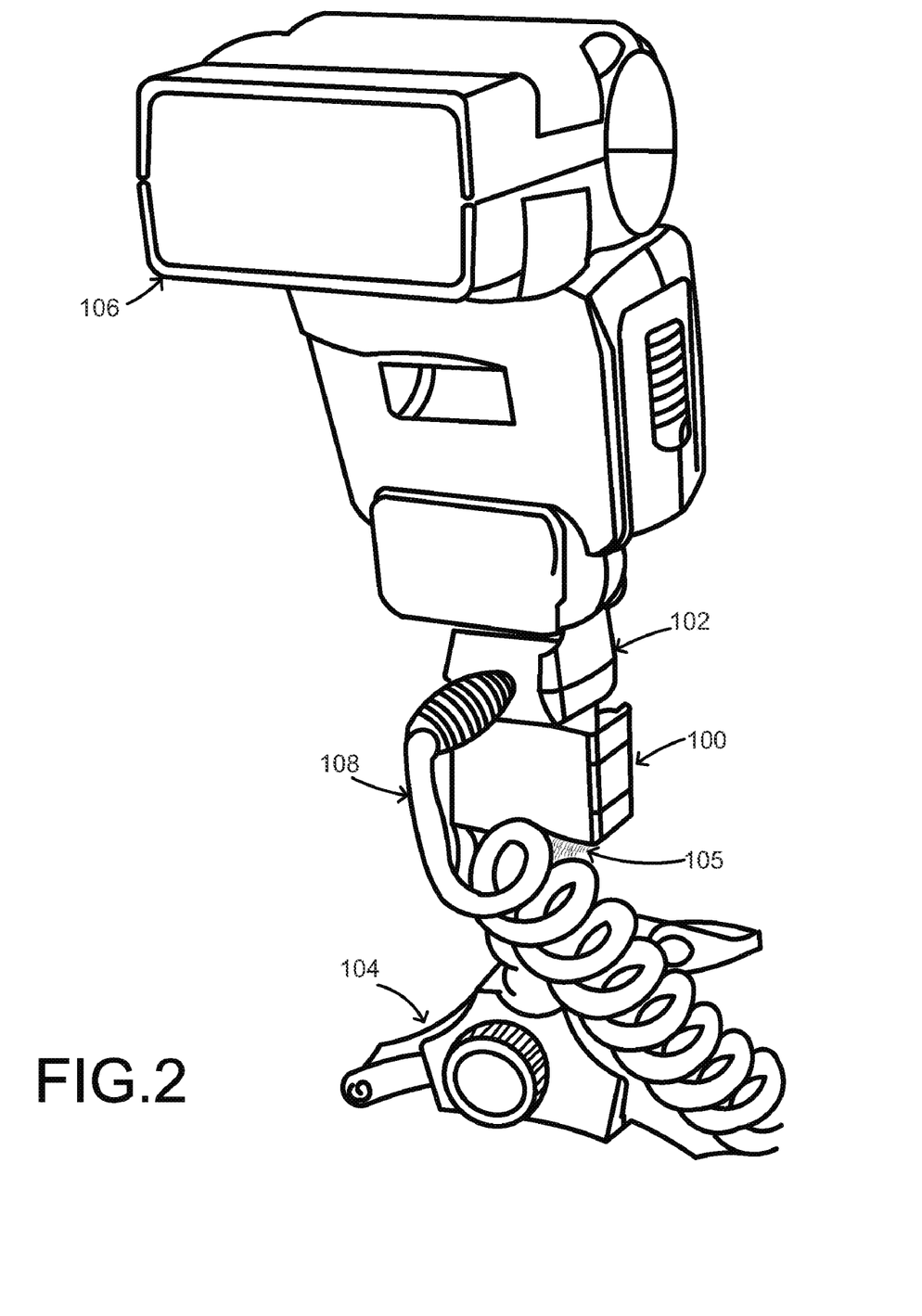
FIG. 2 shows an improved quick-release system for alternately attaching and releasing one piece of photographic equipment to and from another, respectively, including a base plate and a top plate.
Figure 3:
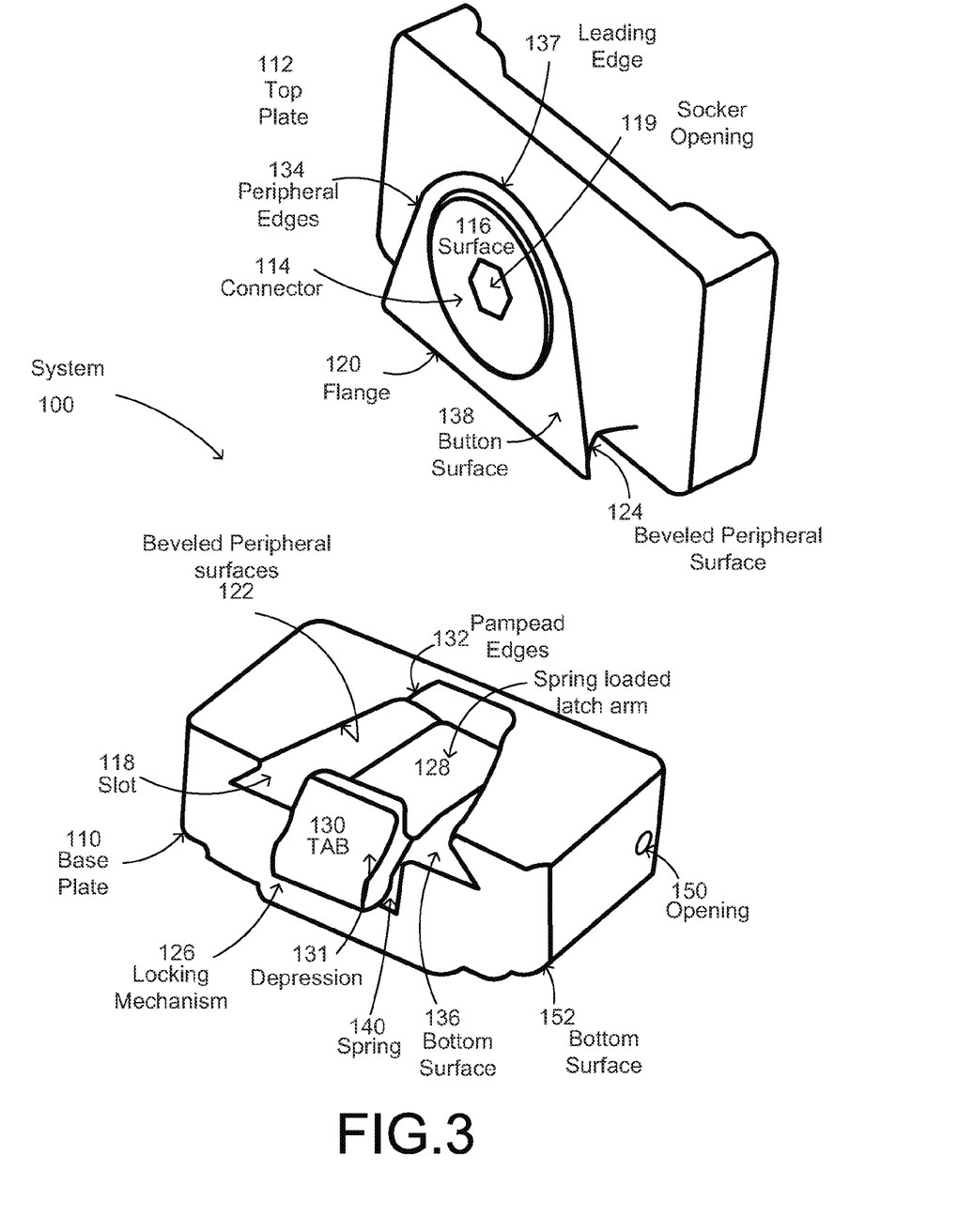
FIG. 3 shows a perspective view of the quick-release base plate and top plate depicted in FIG. 2, detached from each other.
Figure 4:
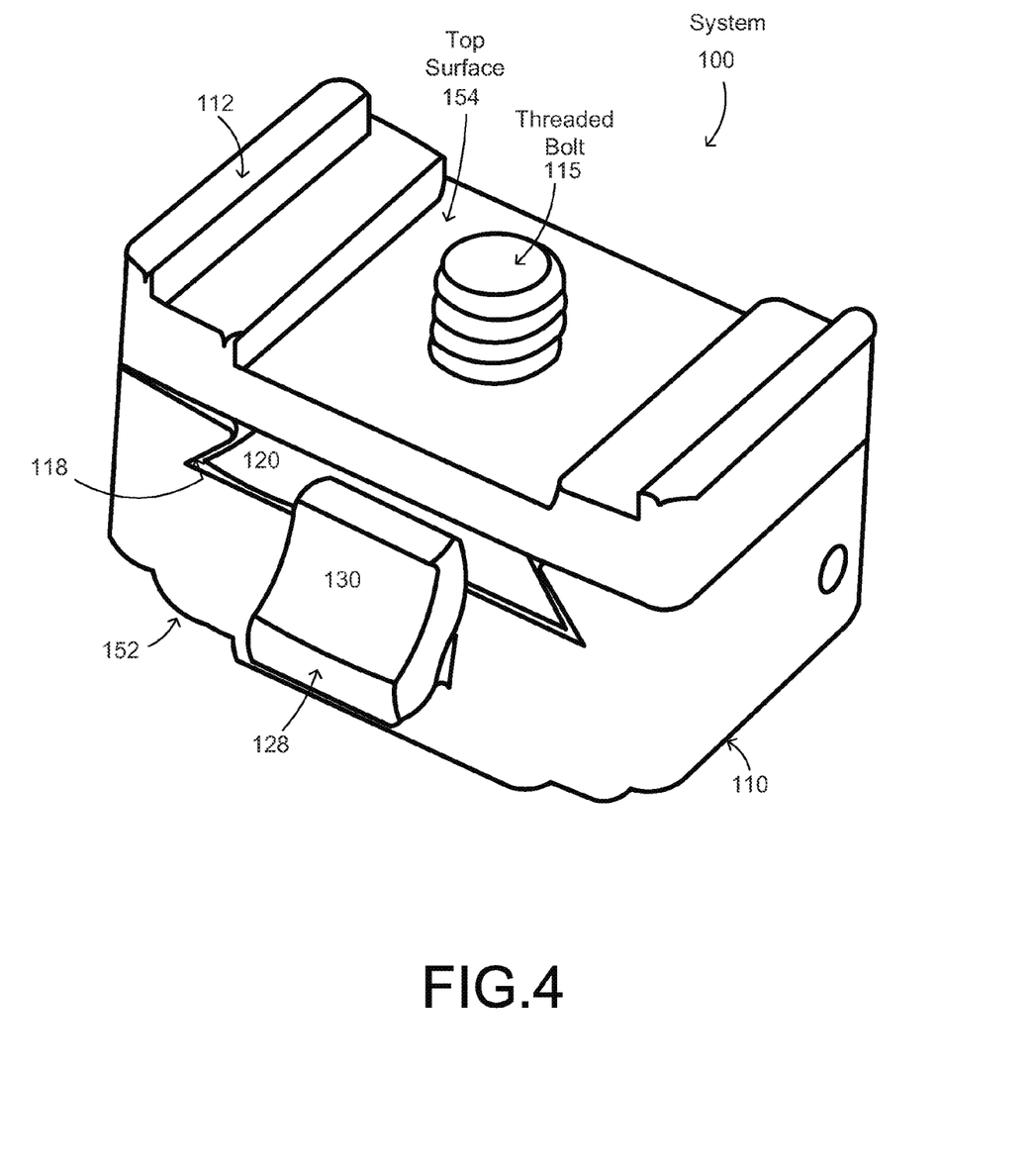
FIG. 4 shows the base plate and top plate depicted in FIG. 2, attached to each other.

FIGS. 2-4 illustrates a modified quick-release system 100 used to alternately secure and release one piece of equipment to another, depicted solely for illustrative purposes as an off-camera shoe adapter 102 (supporting a flash 106 connected to a camera through a cord 108) and a flash bracket 104. The quick release system 100 may comprise a base plate 110 and a top plate 112 selectively, detachably securable to each other between a locked position (shown in FIG. 4) and a released position (shown in FIG. 3). The base plate 110 may be selectively secured to a first piece of photographic equipment, such as the flash bracket 104 through a threaded bore (not shown) in the bottom surface of the base plate 110, into which a threaded bolt of a connector 105 may be inserted. The top plate 112 is in turn secured to a second piece of photographic equipment, such as the off-camera shoe adapter 102 through a connector 114 having a threaded bolt 115 inserted into a threaded bore (not shown) in the base of the second piece of photographic equipment. The connector 114 preferably includes a surface 116 defining a socket opening 119 so that a wrench can be used to connect the top plate 112 to the second piece of photographic equipment. The surface 116 of the connector 114 is also preferably inset into the top plate 112.

When connected to the respective first and second pieces of photographic equipment 102 and 104 as described above, the base plate 110 and the top plate 112 may selectively, lockingly engage the first and second pieces of photographic equipment 102 and 104 quickly, using a single motion due to the structure of the base plate 110 and the top plate 112, respectively. Specifically, the base plate 110 may define a slot 118 into which a flange 120 of the top plate 112 may be matingly inserted. Both the base plate 110 and the top plate 112 may include structural features designed to matingly and rigidly secure the flange 120 when inserted into the slot 118. One such feature may be respectively beveled peripheral surfaces 122 and 124 around the edges of the slot 118 and the flange 120, respectively, that are opposed to each other when the flange 120 is inserted into the slot 118. This ensures substantially rigid contact between the base plate 110 and the top plate 112 when the latter is fully inserted into the former, and prevents inadvertent parallel separation of the two members.

Another feature that rigidly secures the base plate 110 to the top plate 112 may be a locking mechanism 126 having a spring-loaded latch arm 128 in the base plate 110 that automatically locks the flange 120 into the slot 118 when the flange 120 moves from a position incrementally prior to full insertion into the slot 118 to a position of full insertion into the slot 118. Specifically, the peripheral edges 132 and 134 of the slot 118 and flange 120, respectively, are each inwardly tapered in the direction of insertion of the flange 120 into the slot 118. This permits the leading edge 137 of the flange 120 to be inserted into the interior of the slot 118 at an angle of incidence between the bottom surface 136 of the slot 118 and the bottom surface 138 of the flange 120, and cause the bottom surface 138 to contact the top of the latch arm 128. As the motion inserting the flange 120 into the slot 118 continues, the peripheral edges 132 and 134 cause the angle of incidence between the surfaces 136 and 138 to diminish, and thereby push the latch arm 128 downwards, compressing a spring 140, until a position of locked engagement between the base plate 110 and the top plate 112 is reached. In the position of locked engagement, the contact between the latch arm 128 and the bottom surface 138 of the flange 120 ends, and the spring 140 causes the latch arm 128 to move to a locking position where the latch arm 128 is in its original position. This original position of the latch arm 128 may be one where the spring 140 is relaxed, or the spring 140 may be pre-compressed. Alternatively, the latch arm 128 may move to an intermediate position between one that it occupies when the base plate 110 and the top plate 112 are detached from each other, and a position it occupies incrementally prior to locked engagement between the base plate 110 and the top plate 112. Regardless of whether the locking position of the latch arm 128 is in its original position or an intermediate position, the locking position is preferably one where a tab portion 130 of the latch arm 128 extends above the bottom surface 136 of the slot 118 so as to lock the flange 120 into the slot 118. When it is desired to release the flange 120 from the slot 118, the latch arm 128 may be manually depressed to compress the spring 140 until the tab portion 130 is flush with the bottom surface 138, permitting the flange 120 to slide laterally in the slot 118, increasing the angle of incidence between the bottom surface 136 of the slot 118 and the bottom surface 138 of the flange 120. In this unlocked condition, the loading of the spring will tend to cause the flange 120 to slide out of the slot 118. The tab portion 130 may include a depression 131 to facilitate manual depression of the latch arm 128 using a thumb or other digit.

Figure 5:
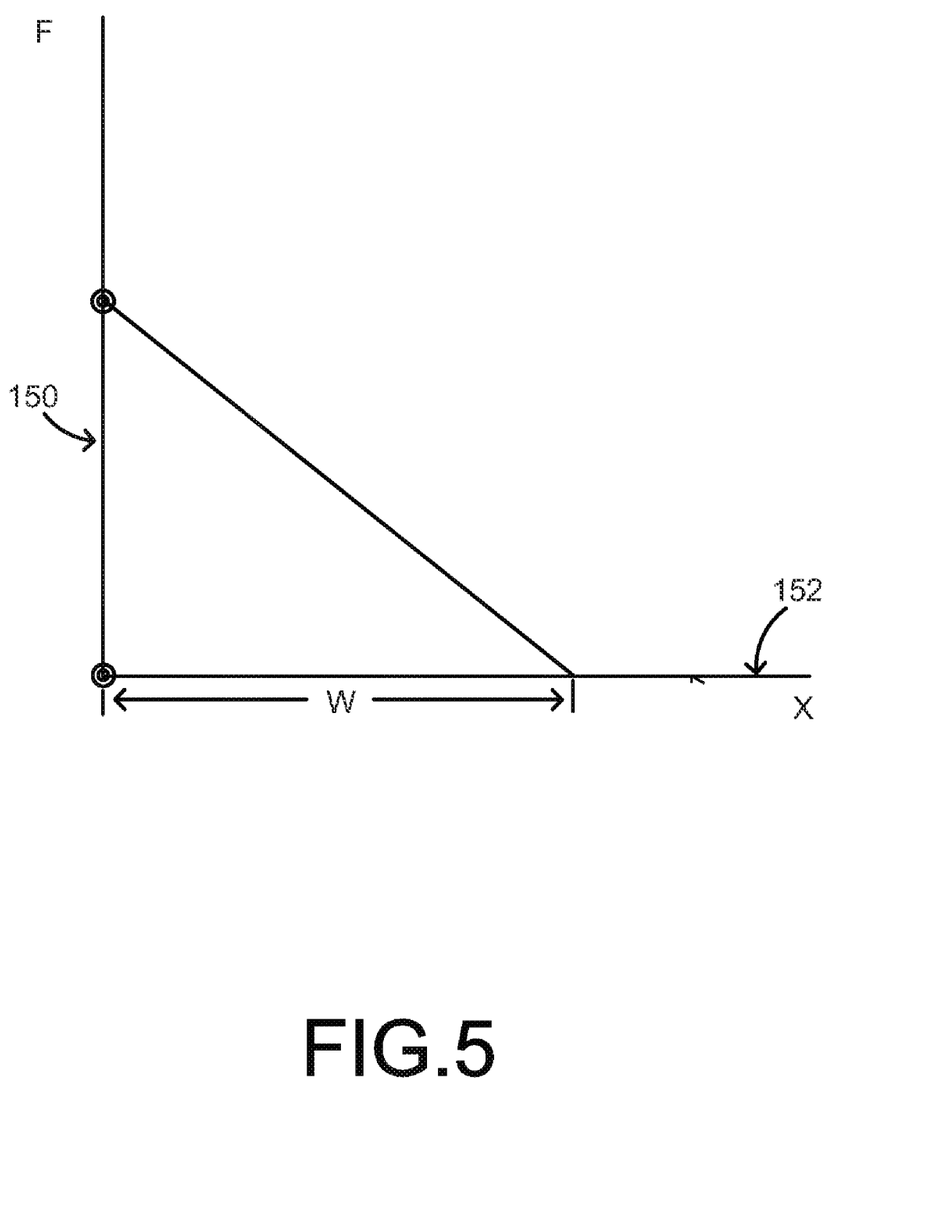
FIG. 5 illustrates the force that the base plate and top plate apply to each other as a function of a difference in position of the top plate from a locked position as it travels to a disengaged position relative to the base plate.

FIG. 5 further illustrates how the top plate 112 to the base plate 110. A vertical axis 150 represents the spring load pushing against both the base plate 110 and the top plate 112 while the horizontal axis 152 represents the relative position of the top plate measured from the "origin" where the base plate 110 and the top plate 112 are lockingly engaged to each other. As illustrated, the force applied by the spring 140 is inversely proportional to position, and intersects the x-axis at a position corresponding to the width or other dimension of the flange portion. The force is continuous except for a marked discontinuity at the origin, i.e. the force applied by the spring drops significantly from a position incrementally prior to locked engagement between the base plate 110 and the top plate 112, and a position of locked engagement between the base plate 110 and the top plate 112. This means that, in order for the top plate 112 to move away from the locked position, the top plate 112 is loaded with a sufficient force to overcome the discontinuity. It should be understood, consonant with the preceding discussion, that though the function shown in FIG. 5 indicates that the load on the spring is zero at the locked position, this is not necessary, so long as the load on the spring in the position of locked engagement is less than a maximum load along the x-axis. Also, though the function shown is linear, it may also be nonlinear, such as a curve.

As noted above, the disclosed apparatus has the advantage of permitting rapid assembly of individual pieces of photographic equipment, when time may be at a premium, as the top plate 112 may be inserted into the base plate 110 using a single motion between an initial state of complete detachment between the base plate 110 and the top plate 112, and locked engagement between these members. As used herein, the term "complete detachment" refers to a condition where, even though surfaces between the base plate 110 and the top plate 112 may be in contact, none of these surfaces engage each other to inhibit further separation from that contact. The term "locked engagement" means a condition where actuation of the assembly must occur prior to separating the base plate 110 and the top plate 112. The term "single motion" means manual translational movement of the top plate relative to the base plate that is either substantially free from temporal interruption or substantially free from actuating the apparatus prior to the manual translational movement and after the top plate 112 and base plate 110 are in contact. It should also be understood that, because disassembly of photographic equipment is not usually as time sensitive as assembly, disengagement of the base plate 110 and the top plate 112 need not be performed in a single motion. To the contrary, the elimination of a step required for disassembly of two pieces of photographic equipment, when instead assembling such pieces, is beneficial because elimination of that step serves the dual purpose of saving time when it is most needed and locking the apparatus into place.

The top plate and the base plate may be fabricated of any suitable material, such as a lightweight aluminum composite or other similarly rigid material. The material selected should be appropriate for the intended weight of any equipment intended to be supported. The latch arm 128 is preferably pivotally secured within the base plate 110 using a pin (not shown) that is inserted into the slot 118 through a small opening 150 in the base plate 110 and a corresponding opening in the latch arm 128. The pin may be secured in place using any appropriate mechanism, e.g. a bonding agent, a plug, thermal contraction and expansion, etc. The slot 118 may define an upper ledge to catch the interior end of the latch arm 128 as it pivots upwards when the latch arm 128 is manually depressed. The latch arm 128 is preferably inserted into the base plate 110 after the spring 140 is inserted into a small mating socket in the base plate 110. As noted earlier, the spring 140 may either be in a relaxed state or in a pre-compressed state when the interior end of the latch arm 128 rests on the bottom surface of the slot 118. Both the base plate and the top plate may be fabricated using any appropriate process, such as machining, an injection mold procedure, etc.

The base plate 110 preferably includes a bottom surface 152 shaped to matingly conjoin with a piece of photographic equipment, such as a flash bracket. Similarly, the top plate 112 preferably includes a top surface 154 shaped to matingly conjoin with a piece of photographic equipment, such as an off-camera shoe adapter. The description of a flash bracket and an off-camera shoe adapter is merely provided for illustrative purposes as other pieces of photographic equipment may be conjoined using either the disclosed apparatus or variations of the disclosed apparatus. In addition, any number of pieces of photographic equipment may be selectively interlocked using multiple respective pairs of base plates 110 and top plates 112. Preferably the top surface 154 is also shaped to matingly engage the bottom surface 152, such that the top plate is selectively, alternately securable to either a piece of photographic equipment and the base plate, while said top plate is secured to the piece of photographic equipment, or the base plate and a second base plate, while the top plate is not secured to a piece of photographic equipment. In the same vein, if the top surface 154 is shaped to matingly engage the bottom surface 152, such the base plate is selectively, alternately securable to either a piece of photographic equipment and the top plate, while said base plate is secured to the piece of photographic equipment, or to the top plate and a second top plate, while the base plate is not secured to a piece of photographic equipment.

Figure 6:
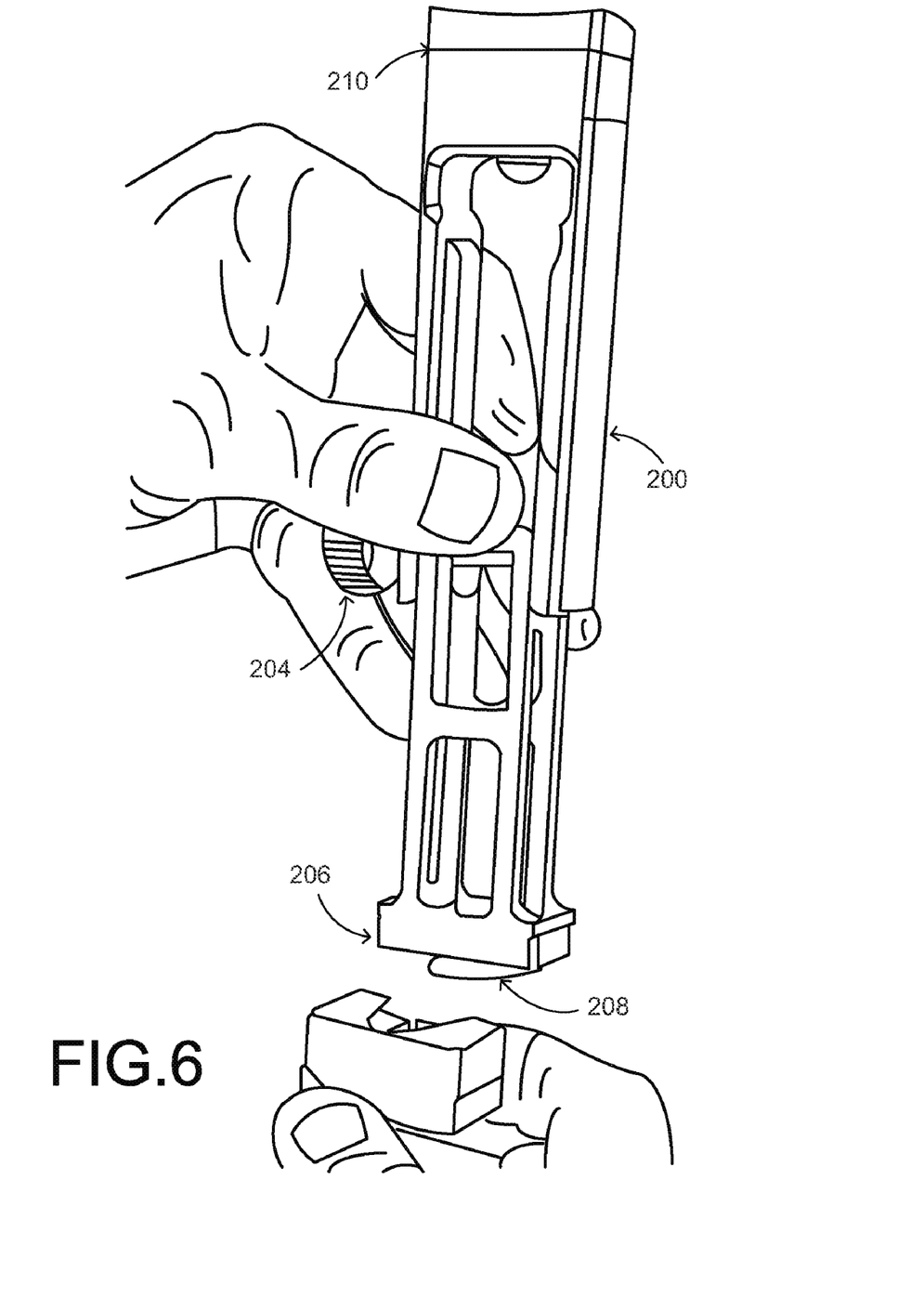
FIG. 6 shows an assembly where two exemplary quick-release systems are used to interconnect three pieces of photographic equipment.

Referring to FIG. 6, an extender 200 may be used to interconnect respective pieces of photographic equipment. The extender 200 may include a central, rigid telescoping portion 202 that selectively extends and retracts using a knob 204. The extender 200 has a first end 206 that defines a flange 208 that extends longitudinally outward from the extender 200. The extender 200 also includes a second end 210 that defines a slot 212. The second end 210 is formed so as to lockingly engage the first end 206 if the flange 208 if slidably inserted into the slot 212 with no more than a single motion as previously defined. The flange 208 and the slot 212 may each be integrally formed with respective members of the rigid telescoping portion 200 that extend and retract with respect to each other. Alternatively, the extender 200 may be constructed by attaching a base plate 110 to one end of the rigid telescoping portion 202 and a top plate 112 to the other end of the rigid telescoping portion 202.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A photographic support apparatus comprising:
    (a) a base plate selectively securable to a first photographic member and including a portion defining a slot having a depressed bottom surface defined by a peripheral edge extending taperingly toward a center of said bottom surface from a first edge of said base plate to a rear surface of said slot remote from said first edge and a peripheral surface projecting from said peripheral edge at a bevel angle;
    (b) a locking tab secured to said base plate proximate said first edge and resiliently urged to a first position blocking access to said slot; and
    (c) a top plate selectively securable to a second photographic member and including a flange having a substantially planar flange surface defined by a peripheral edge taperingly extending toward a longitudinal center of said flange surface from an edge of said top plate to a leading edge of said flange surface and a peripheral surface projecting from said peripheral edge at a bevel angle in opposition to said bevel angle of said peripheral surface of said slot, said top plate lockingly engageable with said base plate with a single motion of said top plate toward said rear surface of said slot from an initial position with said leading edge proximate said bottom surface and said flange surface at a non-zero angle of incidence to said bottom surface, engagement of said beveled surfaces causing said flange surface to depress said locking tab to a second position substantially flush with said bottom surface against said resilient urging incrementally prior to a resiliently return of said locking tab to said first position to lock said top plate in engagement with said base plate.

2. The apparatus of claim 1 where said base plate includes a spring loaded by a lever, said lever mounted in said slot.

3. The apparatus of claim 2 where said tab is affixed to said lever and extends above said bottom surface when said spring is relaxed.

4. The apparatus of claim 3 where said lever may be used to manually compress said spring to an unlocked position of said lever.

5. The apparatus of claim 1 where a spring resiliently urges said tab to said first position and is relaxed when said top plate is lockingly engaged to said base plate.

6. The apparatus of claim 1 where said tab includes a depression for manual movement of said lever.

7. An extender for operatively connecting a camera to an accessory, said extender comprising:
    (a) a first end including a portion defining a slot having a depressed bottom surface defined by a peripheral edge extending taperingly toward a center of said bottom surface from a first edge of said extender to a rear surface of said slot remote from said first edge and a peripheral surface projecting from said peripheral edge at a bevel angle;
    (b) a locking tab secured to said extender proximate said first edge and resiliently urged to a first position blocking access to said slot at said first end of said extender; and
    (c) a second end rigidly spaced apart from said first end and including flange portion having a substantially planar flange surface defined by a peripheral edge taperingly extending toward a longitudinal center of said flange surface from an edge of said extender to a leading edge of said flange surface and a peripheral surface projecting from said peripheral edge at a bevel angle, said flange portion selectively lockable in engagement with a second element having a receptacle including a receptacle slot and a receptacle locking tab substantially identical to said slot and said locking tab at said first end of said extender and affixed to one of said camera and said accessory, said flange portion lockingly engageable with said second element in a single motion of slidable contacting engagement of said second end relative to a rear surface of said receptacle slot from an initial position with said leading edge proximate a bottom surface of said receptacle slot and said flange surface at a non-zero angle of incidence to said bottom surface of said receptacle slot, engagement of said beveled surfaces with opposing beveled surfaces of said receptacle slot causing said flange surface to depress said receptacle locking tab to a second position substantially flush with said bottom surface of said receptacle slot against resilient urging incrementally prior to a resilient return of said receptacle locking tab to a position locking said extender in engagement with said second element.

8. The apparatus of claim 7 where said locking tab is spring loaded and biased in said first position.

9. The apparatus of claim 7 where said first end of said extender is lockingly engageable with a single sliding motion to a third element affixed to another of said camera and said accessory, said third element including a flange substantially identical to said flange defined by said second end of said extender.

10. A photographic support apparatus comprising:
  (a) a first plate selectively securable to a first piece of photographic equipment;
  (b) a second plate selectively, alternately securable to:
    (i) a second piece of photographic equipment and said first plate, while said second plate is secured to said first piece of photographic equipment, said second plate lockingly engageable with said first plate with a single motion of said second plate relative to said first plate; and
    (ii) said first plate and a second said first plate, while said second plate is not secured to said first piece of photographic equipment, said second plate lockingly engageable with said first plate and said second first plate with a single motion of said second plate relative to, respectively, said first plate and said second first plate.

11. The apparatus of claim 10 where said first plate is a top plate selectively securable to an off-camera shoe adapter, and said second plate is a base plate that selectively lockingly engages said top plate while said top plate is secured to said off-camera shoe adapter.

12. The apparatus of claim 10 where said first plate is a base plate selectively securable to a flash bracket, and said second plate is a top plate that selectively lockingly engages into said base plate while said base plate is secured to said flash bracket.

13. A photographic support apparatus comprising:
  (a) first member selectively, lockingly engageable and disengageable with a second member between a first position along a dimension of said second member and a second position along said dimension; wherein
  (b) said second member applies a resisting force to said first member that varies inversely with movement between said first position and said second position, and where said resisting force has a discontinuity.

14. The apparatus of claim 13 where said first position is one of secure engagement between said first and second member, respectively, and said discontinuity is at said first position.

15. The apparatus of claim 13 including a compressible member that applies said resisting force, and where said second member includes a manually-operated actuator to pre-load said compressible member with a sufficient said resisting force to permit movement from said first position towards said second position.

16. The apparatus of claim 13 where said resisting force is linear between said first position and said second position.

\* \* \* \* \*